United States Patent [19]

Yach

[11] Patent Number: 5,518,462
[45] Date of Patent: May 21, 1996

[54] SPRING RETURN ELECTRIC ACTUATOR

[75] Inventor: Robert L. Yach, West Bend, Wis.

[73] Assignee: Jordan Controls, Inc., Milwaukee, Wis.

[21] Appl. No.: 289,900

[22] Filed: Aug. 12, 1994

[51] Int. Cl.⁶ .......................... F16K 31/02; F16H 27/02; F16H 37/04
[52] U.S. Cl. .......................... 475/149; 475/302; 475/312; 475/343; 251/129.11
[58] Field of Search ...................... 251/129.11; 475/149, 475/302, 312, 343

[56] References Cited

U.S. PATENT DOCUMENTS

| | | | |
|---|---|---|---|
| 4,595,081 | 6/1986 | Parsons | 251/129.11 X |
| 4,613,798 | 9/1986 | Baumann | 251/129.11 X |
| 4,621,789 | 11/1986 | Fukamachi | 251/129.11 X |
| 4,742,989 | 5/1988 | Akagi | 251/129.11 X |
| 4,754,949 | 7/1988 | Fukamachi | 251/129.11 X |
| 4,770,390 | 9/1988 | Tratz et al. | 251/129.11 |
| 5,131,623 | 7/1992 | Giordani | 251/129.11 X |
| 5,160,115 | 11/1992 | Ito et al. | 251/129.11 X |
| 5,195,721 | 3/1993 | Akkerman | 251/129.13 |
| 5,345,835 | 9/1994 | Schabert et al. | 251/129.11 X |

FOREIGN PATENT DOCUMENTS 355231  8/1931  United Kingdom ............. 251/129.11

*Primary Examiner*—Charles A. Marmor
*Assistant Examiner*—Nathan O. Jensen
*Attorney, Agent, or Firm*—Foley & Lardner

[57] ABSTRACT

A rotary actuator for opening and closing a valve, damper or linkage for industrial application, the actuator including a housing having a motor mounted thereon for driving a speed reduction gear train to reduce the speed of the motor, the rotary motion of the output shaft of the speed reduction gearing to linear motion against the force of a biasing spring to convert the linear motion of the converting motion to rotary motion of the output shaft.

6 Claims, 3 Drawing Sheets

SPRING RETURN ELECTRIC ACTUATOR

FIELD OF THE INVENTION

The present invention relates to rotary actuators for positioning valves, dampers, linkages, etc. in industrial applications.

BACKGROUND OF THE INVENTION

Rotary and linear actuators exist in various forms to provide rotary or linear positioning of valves, dampers, linkages, etc. in industrial applications. Most of these actuators position the load under closed or open looped control. Some applications require the movement of the load to a "home position" when the process is shut down at the end of the day, shift, or production run of a product. Electronic or other means of cycling the actuator to the "home position" before shut down is relatively easily accomplished. However, if the electric power source serving the actuator and other devices is interrupted, damage to the process can quickly occur if the valve damper or linkage is not shut down.

Moving the load to the "home position" in a controlled and safe manner without the presence of electrical energy is difficult to accomplish by virtue of the few devices available. The means of storing energy must pick up or be transferred to the load in a smooth manner to have the minimal detrimental impact to the process and the equipment involved, including the mechanics of the actuator. After picking up and beginning movement, the actuator must accelerate the load to a reasonable velocity and have adequate energy to get the load to the "home position." After the load is positioned at the "home position," the actuator must have a means of safely dissipating or storing the excess energy. This condition is complicated by the fact that the load is an unknown. It could be at the upper limit of the actuator's capacity or it could be zero in the case of the actuator being cycled to a fully extended or retracted position inadvertently without a load and then having the line power interrupted. Thus, the actuator should be able to effectively handle a full rated load to a zero load condition. Also, line power is often lost for only a few electrical cycles. If the actuator needs to be reset or run through a "cocking" sequence (which preloads the mechanism) following a loss of line power, the process being controlled can easily be upset even though the loss of line power was only of a few milliseconds duration.

SUMMARY OF THE PRESENT INVENTION

In accordance with the present invention a rotary or linear actuator is provided in which a DC step motor or an AC synchronous motor is typically utilized to provide the motive rotary power. These types of motors can produce both running and braking torque. An inertia brake/speed governor is provided for expending, in a controlled manner the excess stored potential energy following the completion of a "spring return" due to the loss of line power. The brake/governor consists of a shaft having a number of spring loaded weights mounted thereon which are allowed to rotate outwardly and rub against a wear surface as the speed of the weights and shaft increases. In addition the weights provide inertia mass to soften the acceleration rate of the mechanism upon "spring return." An important aspect of the invention is the inclusion of a one way roller clutch which is utilized within the spur gearing to allow the motor rotor, the brake/governor, and the gearing to safely, in a controlled manner, overrun following the completion of a "spring return" due to the loss of line power. Another roller clutch is advantageously installed in the brake/governor to further isolate the brake/governor from the motor.

Another important feature of the invention is the use of cam rollers to allow a portion of the rotary motion of the output shaft to be transformed into a linear motion to compress one or more compression springs. The cam rollers act against the edges of a spiral slot in a sleeve to provide a compressive force which matches the increasing compressive forces of the spring. The geometry of the spiral slots transforms the spring rate of the compression springs (an increasing force is required as the springs are compressed further), into a device requiring constant force. Thus, a constant force applied to the output shaft will compress the springs through their range of travel. Otherwise, an increasing force would be required, which would require an increase in overall motor torque. Also, the increased stored energy would only be wasted and would only add to the complexity of the inertia brake/speed governor. The compression springs are confined in a canister to store energy produced by the motor in opening the valve for use when the springs are called upon to move to the "spring return" position initiated by a loss of line power. The springs are housed in a permanently sealed easily replaceable disposable canister.

Linear output shafts may be utilized in lieu of the rotary output sleeve to allow linear motion to be transmitted to the customer's valve or linkage, where required.

Other principal features and advantages of the invention will become apparent to those skilled in the art upon review of the following drawings, the detailed description and the appended claims.

Figure 1:
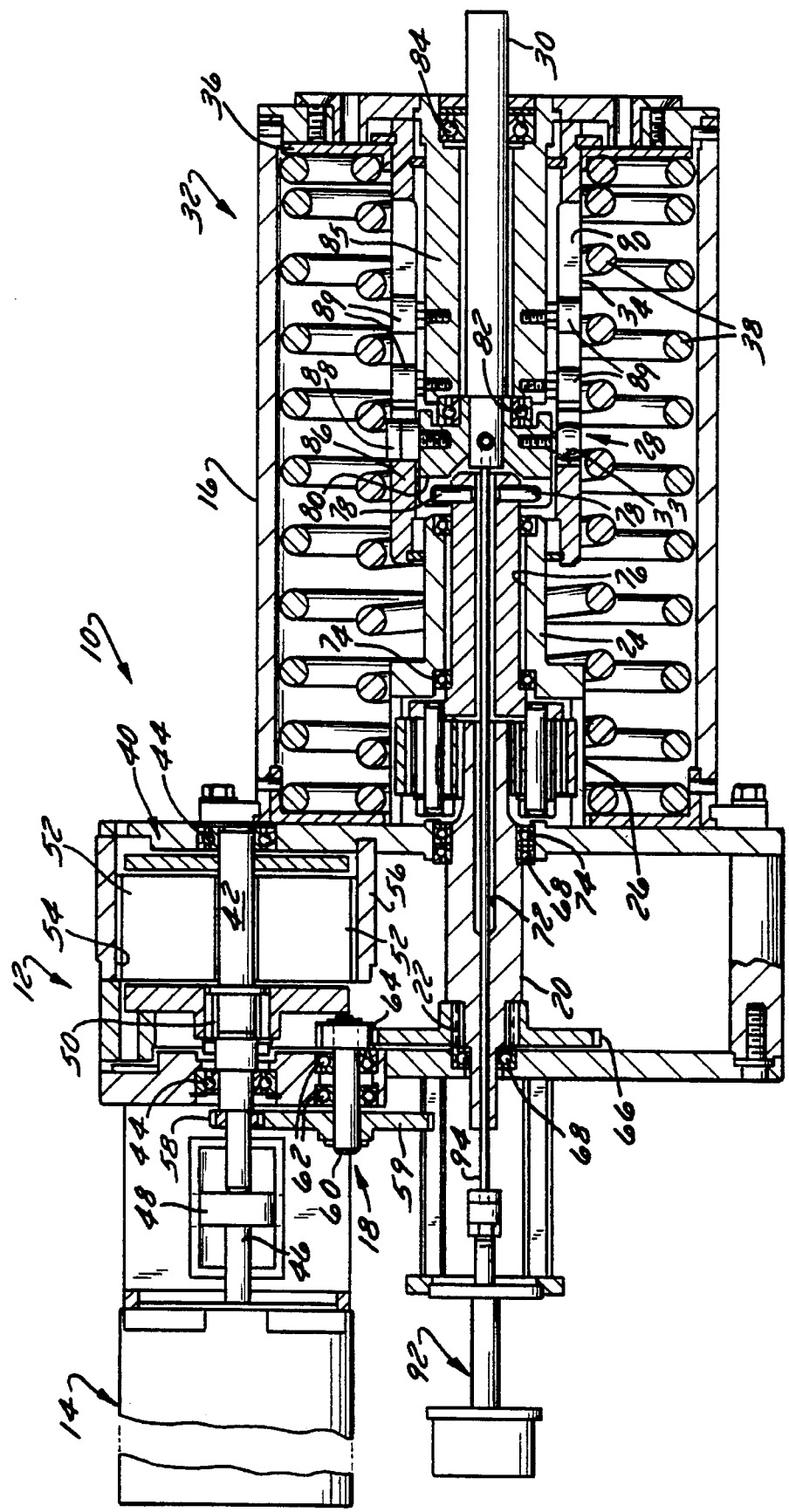
FIG. 1 is a cross section view of the spring return actuator in the closed or rest position.
Figure 2:
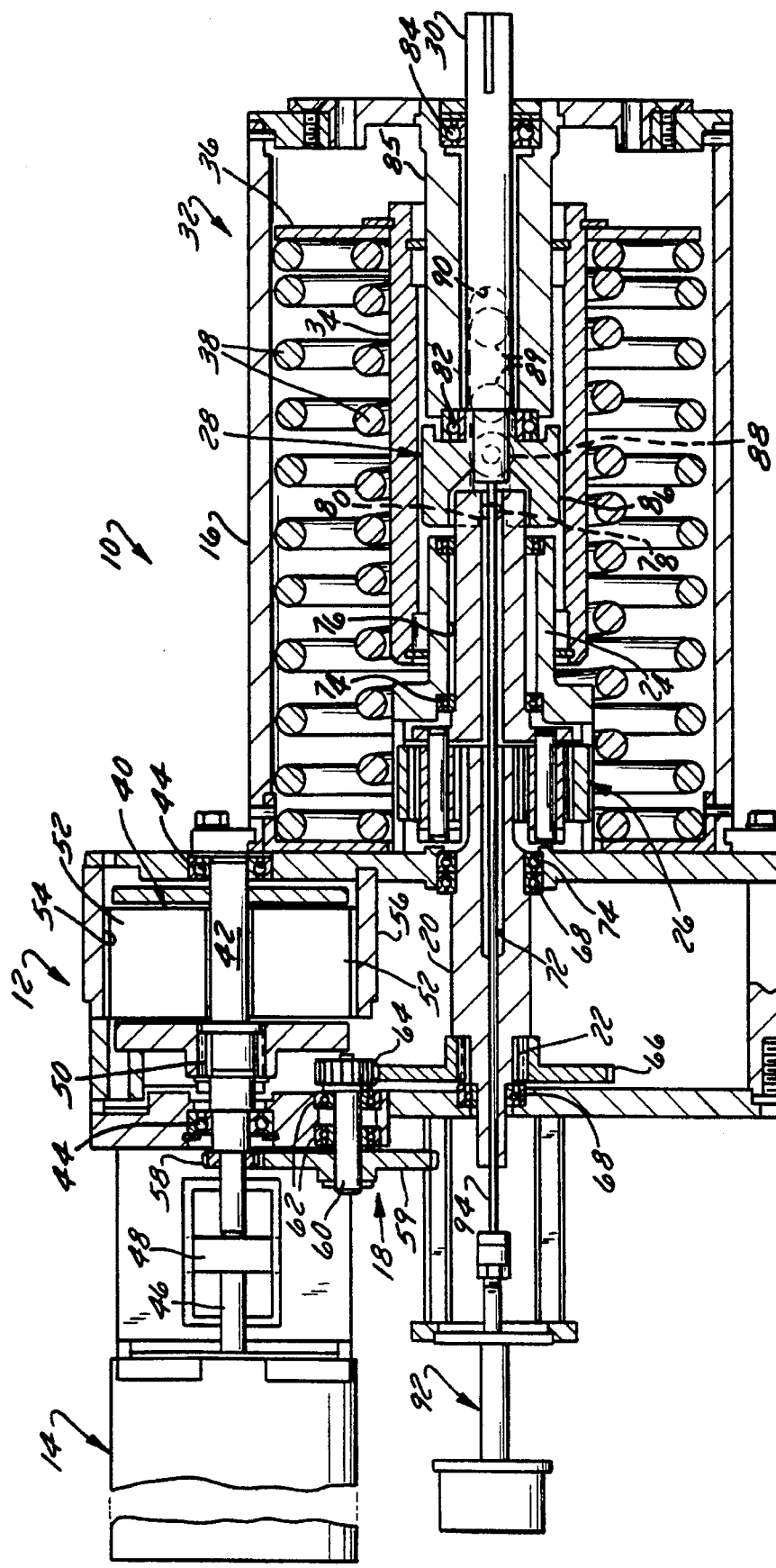
FIG. 2 is a view similar to FIG. 1 shown in the open or loaded position.
Figure 3:
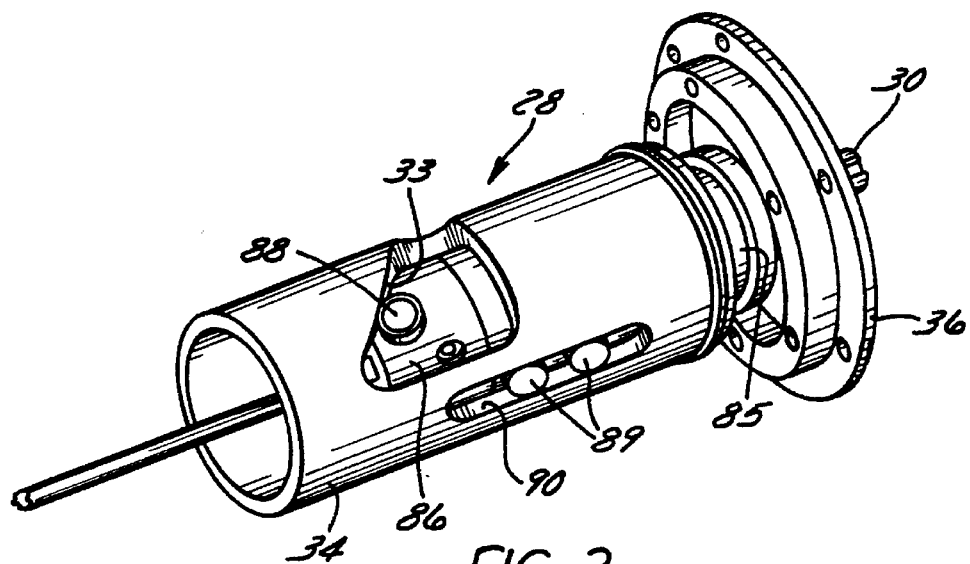
FIG. 3 is a perspective view of the cam roller assembly shown in the retracted or closed position.
Figure 4:
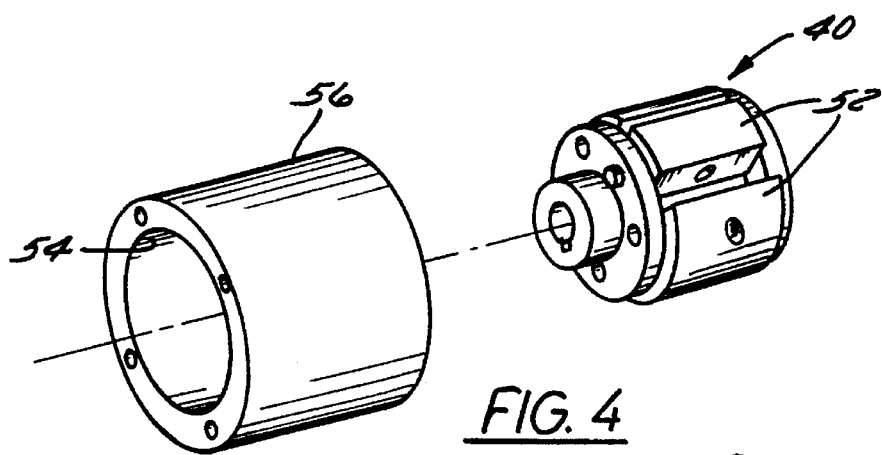
FIG. 4 is an exploded perspective view of the inertia brake/speed governor.
Figure 5:
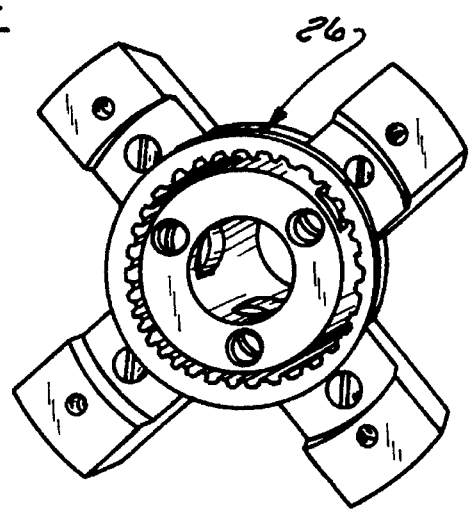
FIG. 5 is a perspective view of the end piece.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The actuator 10 according to the present invention generally includes a housing 12 having a drive motor 14 mounted on one side of the housing and a rotary output shaft 30 mounted on the other side of the housing. The motor 14 is connected to a two stage speed reducing gear assembly 18 which is connected to a drive member 20 by means of a one way roller clutch 22. The drive member 20 is connected to an intermediate drive shaft 24 through a planetary spur gear reduction assembly 26. The intermediate drive shaft 24 is connected to a cam roller assembly 28 which is connected to the output shaft 30. The output shaft 30 is connected to a valve, damper or linkage (not shown). The cam roller assembly 28 is connected to a spring biased return assembly 32 for returning the shaft 30 to the closed position on loss of power to the motor 14. The valve return assembly 32 includes a tubular member 34 having a spiral cam track 33 and a linear cam slot 90. The tubular member 34 is connected to a plate 36 to compress springs 38 in a canister 16 when the rotary output shaft 30 is rotated to open the valve, damper or linkage.

When the power is lost to the motor 14 the springs 38 will force the plate 36 toward the end of the canister. The linear motion of the tubular member 34 is transferred to the cam roller assembly 28 to rotate the output shaft 30 in a closing direction. The rotary motion of the cam roller assembly 28 is transferred through the intermediate drive shaft 24, the planetary gear assembly 26, the drive member 20 and the two stage gear assembly 18 back to the motor 14.

The inertia brake speed governor 40 is operatively connected to the two stage gear assembly 18 to provide (in a controlled manner) the means for expending the excess stored potential energy of the motor following completion of the spring return motion due to loss of line power. The inertia brake 40 is supported on a shaft 42 in the housing 12 by roller bearings 44. The shaft 42 is connected to the drive shaft 46 of the motor 14 by a connector 48. The inertia brake is connected to the shaft 42 by a one way roller clutch 50 to isolate the governor from the motor when the motor is operating in the forward or drive mode. The brake 40 includes a number of spring loaded weights 52 which rub against a wear surface 54 which is secured to the governor housing 56.

The two stage gear assembly 18 includes a spur gear 58 mounted on the shaft 42 in a position to drive a second spur gear 59 which is mounted on a shaft 60 supported in the housing by roller bearings 62. A third spur gear 64 is also mounted on the shaft 60 in mating engagement with a fourth spur gear 66 mounted on a one way roller clutch 22 on drive member 20. The spur gear set reduces the speed of member 20 relative to the motor 14 with a corresponding increase in torque in the member 20.

The drive member 20 is mounted for rotary motion on roller bearings 68 in housing 12 and includes an axially extending bore 72. The planetary spur gear assembly 26 is utilized to further reduce the speed of the intermediate drive shaft 24. The intermediate drive shaft 24 is mounted for rotary motion on roller bearings 74. An axial bore 76 is provided in the intermediate drive shaft 24. The intermediate drive shaft 24 is connected to the cam roller assembly 28 by means of pins 78 which are aligned with slots 80 in the cam roller assembly 28.

In this regard the cam roller assembly 28 is mounted on the end of output shaft 30. The output shaft 30 is mounted for rotary motion on angular contact bearing 82 and roller bearing 84 provided at each end of a tubular shaft 85. The cam roller assembly 28 includes a housing 86 which is secured to one end of the output shaft 30. A pair of cam rollers 88 are provided on each side of the housing which are aligned in the spiral slots 33 in the tubular member 34. The rotary motion of the cam rollers 88 moves the tubular member 34 axially with respect to the spring canister 16. The plate 36 progressively compresses the springs 38 as the tubular member 34 moves axially in the canister 16. The tubular member 34 is prevented from rotating by means of cam rollers 89 which are mounted on the tubular shaft 85 and aligned in slots 90 in the tubular member 34.

The rotary position of the output shaft 30 is monitored by a feedback assembly 92 which is connected to the output shaft 30 by means of a pin 94 which passes through the bore 72 in the intermediate member 20 and the bore 76 in the intermediate drive shaft 24.

In operation the motor 14 provides torque through the two stage gear assembly 18 to the planetary reduction gear 26. The one way roller clutch 50 isolates the motor 14 from rotating the brake/governor 40 when compressing the springs 38 but drives the brake/governor 40 when the springs expand. As the springs 38 expand the brake/governor 40 is accelerated to motor speed. When power to the motor is interrupted the roller clutch 50 allows the brake/governor 40 to continue to overrun until the potential energy of the brake/governor 40 is dissipated. The compression spring loading of the weights in the brake/governor is sufficient to restrict the weights from rotating outward and creating any drag at normal operating motor speed. Therefore, the brake/governor has minimal effect on motor operation. The intermediate shaft 24 of the planetary reduction gear transmits torque and motion to the output shaft 30 by means of the pins 78 coupled to the cam roller assembly 28.

In normal operation the motor is energized and the motor torque is transmitted through the spur gear reduction assembly 18 and the planetary reduction gear assembly 26 to the rotary output shaft 30 to position the load while compressing the springs 38. As the motor senses that the rotary output shaft has reached the command position the motor switches from the run mode to the hold mode. The actuator then waits for another command to run further in the load direction or to return to its initial position, thus the motor continues to seek the command position as directed and to hold the load and the spring when the command position has been reached.

In the event of a loss of line power the motor will immediately lose the ability to hold the load and the stored energy of the springs 38. The springs 38 begin to expand to the spring return position and back drive the slotted tube 85, planetary gear 26, spur gear 22, brake/governor 40 and the motor rotor. As the velocity of the inertia brake weights exceeds normal motor operating speed the hinged weights on the governor press against the bore to limit the velocity to an acceptable level. When the load and actuator have reached the home position the brake/governor weights and support assembly, the motor rotor and spur gearing are allowed to overrun and spin down to allow their inertia energy and the excess stored energy from the springs to harmlessly dissipate due to the action of the roller clutch 22.

Thus, it should be apparent that there has been provided in accordance with the present invention a spring return electric actuator that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A rotary actuator for opening and closing a valve, damper or linkage for industrial applications, said actuator comprising:

a housing, a motor mounted on said housing, an output shaft mounted on said housing, speed reduction means connecting said motor to said output shaft for moving said shaft between open and closed positions with respect to a valve, linkage, or damper, said speed reduction means including:

two stages of spur gearing to reduce the speed of the motor, a planetary spur gear to further reduce the speed of the motor, means for biasing said output shaft to a closed position on loss of power to said motor, means for converting the rotary motion of the output shaft to linear motion of the said biasing means whereby on loss of bower to the motor the biasing means will convert the linear motion of the converting means to rotary motion of the output shaft to close the valve, damper or linkage, and a one way roller clutch between said spur gearing and said planetary spur gear to allow said motor and spur gearing to overrun following the return of the biasing means.

2. The actuator according to claim 1 including means connected to said speed reduction means for expending the stored potential energy of said biasing means due to a loss of line power.

3. A rotary actuator for opening and closing a valve, damper or linkage for industrial applications, said actuator comprising:

a housing, a motor mounted on said housing, an output shaft mounted on said housing, speed reduction means connecting said motor to said output shaft for moving said shaft between open and closed positions with respect to a valve, linkage, or damper, means for biasing said output shaft to a closed position on loss of power to said motor including an inertia brake speed governor operatively connected to said speed reduction means for expending the excess stored potential energy of the motor, and a one way roller clutch connecting said inertia speed governor to the motor to isolate the governor from the motor when the motor is operating in the drive mode.

4. An actuator for opening and closing a valve, damper or linkage for industrial applications, said actuator comprising:

a housing, an electric motor mounted on said housing, an output shaft mounted on said housing for operating the valve, damper or linkage, a speed reduction gear assembly operatively connecting said motor to said shaft, a spring assembly operatively connected to bias said shaft to a closed position;

a one way roller clutch connecting said speed reduction gear assembly to said shaft, and means for compressing said spring assembly on opening the valve, damper or linkage whereby said spring assembly will bias said output shaft to close the valve, damper or linkage on loss of power to said electric motor.

5. The actuator according to claim 4, said shaft including an intermediate shaft, a planetary gear connected to said shaft and an intermediate shaft connecting said one way roller clutch to said planetary gear.

6. The actuator according to claim 4 wherein said compressing means comprises a tubular member having a pair of spiral slots and a pair of cam rollers provided on said housing in alignment with spiral slots whereby rotary motion of the cam rollers will move said tubular member axially to compress said spring assembly.

\* \* \* \* \*